United States Patent [19]

Padalino

[11] Patent Number: 4,786,303
[45] Date of Patent: Nov. 22, 1988

[54] METHOD OF FABRICATING A GLASS NOZZLE ARRAY FOR AN INKJET PRINTER

[75] Inventor: Marco Padalino, Dallas County, Tex.

[73] Assignees: Ricoh Company, Ltd., Tokyo, Japan; Ricoh Systems, Inc., San Jose, Calif.

[21] Appl. No.: 37,413

[22] Filed: Apr. 13, 1987

Related U.S. Application Data

[63] Continuation of Ser. No. 006,773, Jan. 27, 1987, abandoned.

[51] Int. Cl.⁴ ............................................. C03B 23/207
[52] U.S. Cl. ......................................... 65/4.21; 65/42; 65/43; 65/55; 346/1.1; 346/140 R
[58] Field of Search ..................... 65/4.21, 4.3, 42, 43, 65/55, 56; 346/140 R, 1.1

[56] References Cited

U.S. PATENT DOCUMENTS

| | | | |
|---|---|---|---|
| 3,272,063 | 9/1966 | Singer | 65/4.21 X |
| 3,754,882 | 8/1973 | Esdonk et al. | 65/56 X |
| 4,021,216 | 5/1977 | Asam et al. | 65/42 X |
| 4,112,170 | 9/1978 | Rauscher | 346/140 R X |
| 4,112,436 | 9/1978 | Cone | 346/1.1 X |
| 4,165,226 | 8/1979 | Kita | 65/42 |
| 4,590,492 | 5/1986 | Meier | 65/4.3 X |

Primary Examiner—Robert L. Lindsay
Attorney, Agent, or Firm—Flehr, Hohbach, Test, Albritton & Herbert

[57] ABSTRACT

The method of this invention comprises first forming an assembly of a number N of cored glass fibers, separated by a number M of solid glass fibers. After a row of such alternated cored and solid glass fibers is assembled, a uniform pressure is applied to all sides of the assembly. All of the rectangular glass fibers are selected to have the same thermal properties, characterized especially by having the same softening temperature and the same coefficient of expansion. The entire assembly is inserted in an oven subject to a temperature sufficient to soften the glass and thus fuse the parts together. The assembly is cooled and the glass block is removed from the oven. The block can then be cut into thin nozzle wafers and finished to produce the desired jet nozzles. The method may use glass fibers made of two types of glass. The central portion of the fiber comprises a high-temperature glass, this portion surrounding the core. The remainder of the fiber comprises a low-temperature glass, said glass having the same thermal properties as the adjacent fibers and the plates. Multiple rows of the multi-nozzle arrays may be formed. The array may be comprised of a plurality of nozzles aligned in vertical columns at an angle of 90° to the direction of the rows, to provide especially for multi-color printing. Alternatively, the nozzles may be aligned so that the descending columns are at an angle less than 90° with the direction of the row. In this way, high density printing can be achieved.

19 Claims, 2 Drawing Sheets

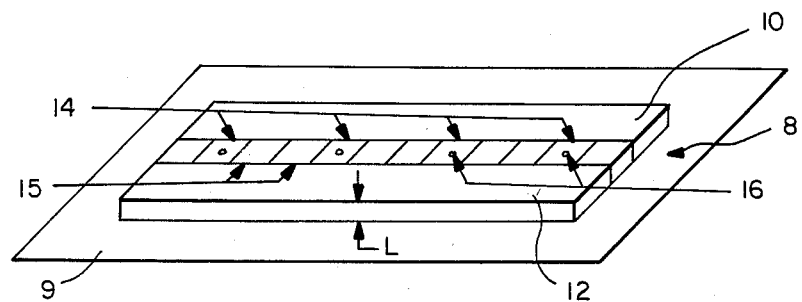
FIG.—1
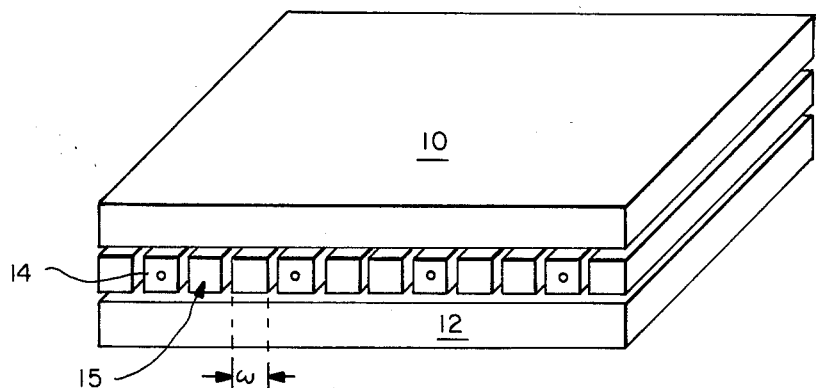
FIG.—2A
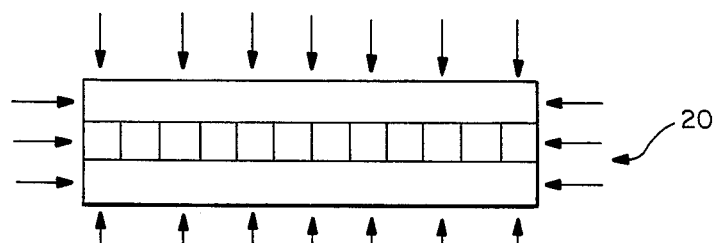
FIG.—2B
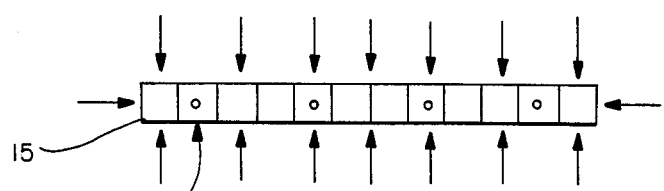
FIG.—3

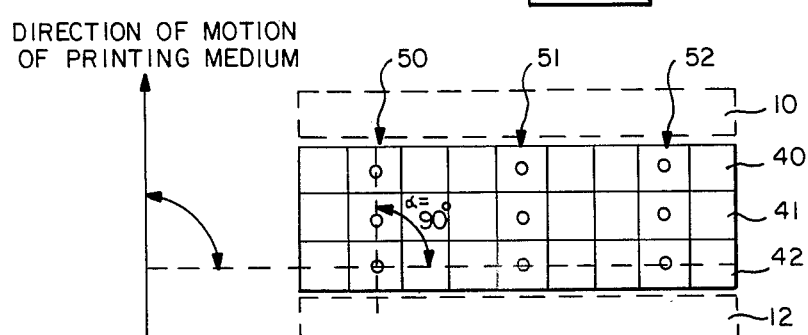
FIG.-4
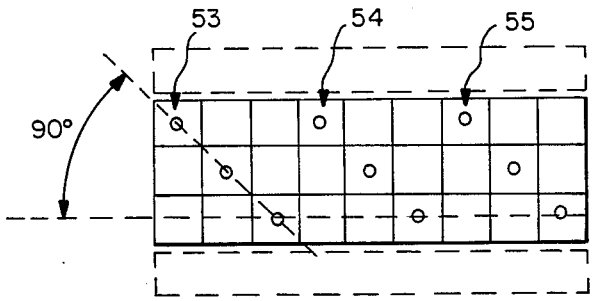
FIG.-5A
FIG.-5B
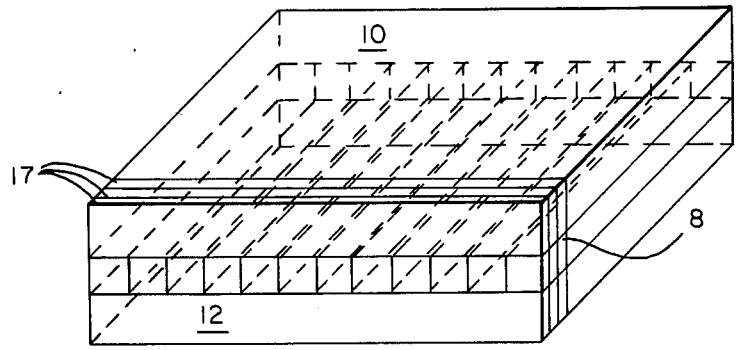
FIG.-6

METHOD OF FABRICATING A GLASS NOZZLE ARRAY FOR AN INKJET PRINTER

CROSS-REFERENCE TO RELATED APPLICATION

This application is a continuation-in-part of U.S. application Ser. No. 07/006,773, filed Jan. 27, 1987 now abandoned.

FIELD OF THE INVENTION

This invention relates to glass nozzle arrays and a method of producing them, and more particularly to a glass nozzle array of the type usable in an inkjet printing apparatus to provide orifices in an orifice plate or charge plate assembly.

BACKGROUND OF THE INVENTION

Inkjet printing apparatus of the type in which this invnetion is intended to be utilized produce a plurality of uniform drops aligned parallel to one another and perpendicular to the movement of paper or other material on which printing is to occur. The printing is achieved by using a reservoir of printing fluid such as ink, with a plurality of aligned orifices in one surface of the reservoir. The ink is ejected through these orifices at a predetermined rate and is stimulated in such a manner that uniform drops of ink are formed at the ends of filaments of ink which issue from the orifices. A series of charge electrodes are positioned adjacent the points of drop formation and are connected to sources of charging control voltage, so that corresponding electrical charges are induced upon the drops at their respective times of formation. The drops then pass through an electrical deflection field that causes drop deflection in correspondence with the applied charges. Uncharged drops may be directed onto an appropriately positioned catcher.

Alternatively, drops charged above some predetermined level may be directed onto the catcher. The remaining drops reach the medium upon which printing is to occur to carry out the printing function.

Economical methods of forming the orifices in an orifice plate or holes in a charge plate are difficult to establish since the nature of the system requires the use of extremely small diameter holes in these plates. For example, the orifices in a typical orifice plate are generally in the range of 0.0005 to 0.0015 inches in diameter, and the holes in a typical charge plate are generally in the range of from 0.005 to 0.010 inches in diameter.

It has been recognized that orifice plates for inkjet printing apparatus may be fabricated from glass tubes aligned to form a uniform array of orifice nozzles as, for example in Cone U.S. Pat. No. 4,112,436 or Humenik U.S. Pat. No. 4,122,460. However, the major problem in implementing this fabrication step resides in aligning, supporting and bonding the glass tube in place. For example, Cone teaches etching parallel V grooves in a silicon wafer which is then split to form a pair of support wafers. The wafers are secured to a frame having an underlying glass plate in spaced relation in a horizontal plane, and glass fibers are positioned in the grooves. Resin is then poured over the fibers and fills the spaces between the fibers and the underlying glass plate. A second glass plate is placed over the epoxy and the assembly is clamped with glass plates to form a sandwich. The epoxy is cured and the assembly is sliced orthogonally to form thin nozzle array sections. However, the difficulty with using the approach that because V grooves are used to support the glass fibers, only a limited number of points of contact exist between the fibers and the substrate. Moreover, the flow of epoxy over the surface of the fibers may be uneven, resulting in a weak assembly.

In an alternative approach, disclosed in Dressler, U.S. Pat. No. 4,429,322, the glass fibers are aligned in a mold and a molding compound is poured over and around the fibers and permitted to cure. In another approach disclosed in the same patent, the fibers are aligned in parallel spaced relationship on a glass or ceramic substrate using double faced adhesive tape to hold the fibers in position while ceramic paste is applied. After heating to cure the ceramic paste, the solder glass frit is dusted over the fibers and compacted with ultrasonic vibration. A cover plate of glass or ceramic is positioned and the assembly is heated to seal the fibers. Again, a weak assembly results because of the lack of contacting support between the substrate and the fibers, and the likelihood of the formation of gaps or bubbles where the tape epoxy or frit does not flow, because of the extremely small diameters being used for the glass nozzles.

Another approach is shown in Hoffman, U.S. Pat. No. 4,019,886, where a plurality of glass nozzles are shown in FIGS. 1A and 1B aligned in channels, with the spacing being fixed essentially by the diameter of the elements. Again, serious problems result from lack of alignment between the fibers, and the inablity to flow the epoxy or other sealing material evenly over the fibers.

SUMMARY OF THE INVENTION

Accordingly, the need exists in the technology for a process for fabricating glass orifice nozzle arrays for use in inkjet printing apparatus which avoids the problem of alignment and bonding of debris in the apertures of the nozzles.

More particularly, an objective of this invention is to provide a method for forming a glass nozzle array for an inkjet printer which provides strong, stable support for the glass fibers in the assembly.

Yet another objective herein is to provide a method of assembling glass nozzle arrays which will eliminate the locating grooves and encapsulating materials which are the most serious sources of weakness in nozzle arrays assembled according to known methods.

A further objective is to provide a homogeneous, all-glass package for a wafer nozzle assembly.

A further disadvantage of present technology is that due to the extremely fine width being used for the grooves for fiber alignment, i.e., grooves wide enough to accurately align a fiber having a 0.005" external diameter, a great deal of time is lost in the assembly process. It is an objective herein to provide a glass nozzle array having a significantly reduced fabrication time.

These and other objectives herein are provided by first forming an assembly of a number N of cored glass fibers, separated by a number M of solid glass fibers. By cored glass fibers, as used herein, is meant either the type of fiber in which the core has already been opened, or what are called etchable cored fibers wherein after the nozzle array is assembled, the core is opened. By solid glass fibers, as used in this invention, is meant either preferably glass fibers in which no core is provided, or alternatively, in which a solid core is provided but in which it is not etched. The cored and solid glass fibers can be square or rectangular or any combination thereof. All the glass fibers are selected to have the same thermal properties, characterized especially by having the same softening temperature and the same coefficient of expansion.

After a row of such alternated cored and solid glass fibers is assembled, a uniform pressure is applied to all sides of the assembly. The entire assembly is inserted in an oven, subject to a temperature sufficient to soften the glass and thus fuse the parts together. The assembly is cooled and the glass block is removed from the oven. The block can then be cut into thin nozzle wafers and finished to produce the desired jet nozzles. In a preferred form, glass plates are laid on the top and bottom of red form, glass plates are laid on the top and bottom of the assembly to maintain alignment of the row of fibers. As with the embodiment described above, the glass plates have the same thermal properties as the fibers.

In either above-described embodiment, an alternative and preferred method is to use glass fibers made of two types of glass. More particularly, the central portion of the fiber comprises a high-temperature glass, this portion surrounding the core. The remainder of the fiber comprises a low-temperature glass, said glass having the same thermal properties as the adjacent fibers and the plates.

In another alternative form of this invention, multiple rows of the multi-nozze arrays may be formed. The array may be comprised of a plurality of nozzles aligned in vertical columns at an angle of 90° to the direction of the rows, to provide especially for multi-color printing. Alternatively, the nozzles may be aligned so that the descending columns are at an angle other than 90° with the direction of the rows. In this way, high density printing can be achieved without having to incline the assembly relative to the printing medium. Such an array is especially useful in providing a high number of nozzles, higher than can normally be provided in a single row because typically nozzles are weaker than the spacers, and because the density of the flow of drops through the charge plate must be kept below some maximum tolerable level.

In the above assemblies, the desired center-to-center distance between adjacent nozzles is assured through the size of the fibers, the pressure applied to the sides of the assembly during the heating and fusing operation, and the time during which the assembly is subjected to the fusing temperature.

This invention provides a method of fabricating a glass nozzle array that does not use the encapsulating material which characterizes all known prior art methods to seal the assembly. The present method relies instead on the thermal properties of the materials for a good seal. As a result, the finished array is stronger and more tolerant of ink properties than known nozzle array assemblies.

The disclosed preferred embodiment uses glass fibers that include a central section of high-temperature glass and a periphery of lower temperature glass, with or without an additional etchable core. The fibers are characterized by the provision of different softening temperature glasses so that the internal high-temperature glass guarantees the mechanical and physical integrity of the nozzle throughout the thermal cycle, while the lower temperature glass provided on the periphery provides the necessary sealing function which must be achieved during the thermal cycle.

BRIEF DESCRIPTION OF THE DRAWINGS

The features and advantages of this invention will be better understood by making references to the following drawings, wherein:

FIG. 1 is a perspective view of a finished glass nozzle array constructed according to the method of this invention;

FIGS. 2A and 2B illustrate a perspective view and a cross-section of an assembly of square glass fibers and glass plates in accordance with one method of this invention;

FIG. 3 illustrates an alternative embodiment of this invention, including the relative spacing of the glass fibers, and the pressures to be applied to achieve the finished nozzle array;

FIG. 4 illustrates an alternative glass fiber comprising a high-temperature core section and a lower temperature surrounding section;

FIG. 6 is a perspective view of an assembly of a plurality of rectangular fibers and glass plates, assembled for cutting into finished nozzle arrays in accordance with the teachings of this invention.

DESCRIPTION OF A PREFERRED EMBODIMENT

Figure 5A:
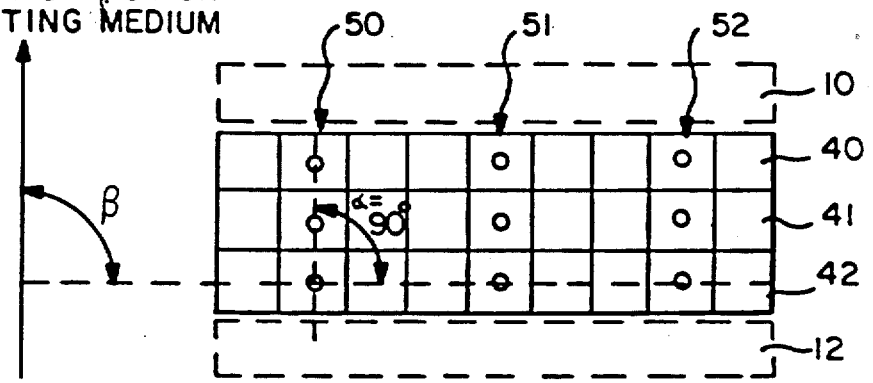
FIGS. 5A and 5B illustrate alternative methods of assembling cores in accordance with this invention to form multi-row arrays.

The glass nozzle array 8 produced by the method of this invention is illustrated in the perspective view of FIG 1; it comprises basically a pair of parallel spaced glass plats 10, 12, and a plurality of cored glass fibers 14 separated by solid glass fibers 15 disposed in spaced parallel relation, the separation being defined by the number of solid fibers intervening between cored fibers. In contrast to the prior art which relies on encapsulating materials such as epoxies to seal the assembly together, the present method relies exclusively on the matched thermal properties of the cored and solid glass fibers for providing a seal. The result is an accurately aligned but much stronger finished wafer nozzle array 8, highly tolerant of the properties of the ink being delivered. The array is shown mounted on a support plate 9 for insertion into an inkjet printer.

It is believed the assembly method disclosed herein can be used for the nozzle array of either the charge plate or the orifice plate of an inkjet printer, depending on the diameter of the openings 16 of the nozzles and the thickness L of the glass nozzle array 8.

An example of the construction method of this invention is given with respect to FIG. 2. A number N of cored glass fibers 14 is assembled, separated by a number M of solid glass fibers 15. The separation between the cored glass fibers 14 which are to be used as the nozzles of the finished array is defined by the width W and number of intervening solid glass fibers 15.

Two glass plates 10, 12 are then placed above and below the glass wafers to sandwich the wafers together. All these parts 10, 12, 14, 15 are chosen to have the same thermal properties, in particular the same softening temperature and coefficient of expansion, along any of their contacting surfaces. The assembly 20 shown in FIG 2A is then placed in a fixture (not shown) which spring clamps all the parts together, and comprises means for applying a uniform pressure all around the assembly as graphically illustrated in FIG. 2B.

The entire assembly is then placed in an oven, subjecting it to a temperature which is sufficient to soften the glass and fuse the parts together. The assembly 20 is then gradually cooled, and the resulting glass block is removed from the fixture.

As illustrated in FIG. 6, the finished block is then cut along lines 17 into the thin nozzle wafers 8, mounted on a backing plate 9, machined to the desired thickness, polished, and where etchable solid core fibers were used, the nozzles are opened. Lapping and polishing of each wafer is carried out prior to the mounting on the blocking plate to provide a smooth bonding surface.

In an alternative to the method disclosed above (illustrated in FIG. 3), the fiber assembly comprising cored fibers 14 and solid fibers 15 may be sandwiched between plates 10 and 12 which have a teflon coating or the like so they do not adhere to the fibers 14, 15 when heat and pressure are applied. The steps of the method described with respect to FIGS. 2A and 2B can then be repeated. However, by substituting plates that do not adhere to the glass fibers, the criticality of the thermal properties of the plate, in particular, the need for exactly the same softening temperature and coefficient of expansion in glass fibers and in the plates, is removed.

In an especially preferred embodiment, an alternative method is to use glass fibers (either cored or solid) made up of two types of glass as shown in FIG. 4. The two types of glass are radially separated or differentiated, and comprise an inner section 30 which comprises a high-temperature glass, and an outer section 32, surrounding the periphery of the high-temperature glass fiber and comprising a low-temperature glass. By using this form of glass fiber, the ultimate center-to-center distance between the adjacent nozzles and especially the integrity of the extreme fine diameter core (on the order of 0.001") is protected by the high-temperature glass 30. The low-temperature glass 32 is more easily softened, and facilitates the fusing of adjacent glass fibers. Thus, in the method shown with respect to FIGS. 2A and 2B, if the fibers comprising two types of glass are substitued for all of fibers 14 and 15, and the assembly is heated and pressure applied to the fixture, the heating need only be to a temperature above the softening temperature of the low-temperature glass, but below the softening temperature of the high-temperature glass. The plates 10, 12 shown in the figures, also comprise on their facing edges to the fibers at least, the low temperature glass.

As a further alternative, the separating fibers 15 may be a single glass type, made entirely of low-temperature glass, to reduce the cost of the total assembly. In this case, if the method of FIGS. 2A and 2B is being used, the facing plates 10, 12 again comprise the lower softening temperature glass.

Figure 5B:
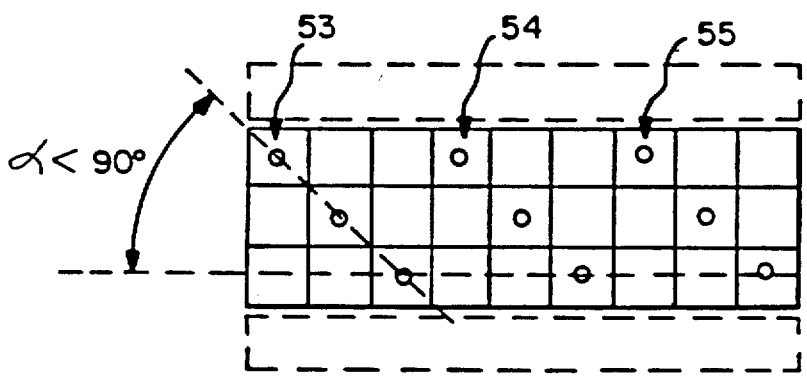

The methods of the embodiments above can be expanded to build multiple nozzle arrays such as are shown in FIGS. 5A and 5B. The array of FIG. 5A comprises a plurality of rows formed according to the method shown in FIG. 2 except that all the rows 40, 41, 42 are assembled before the plates 10, 12 are put in place. The nozzles form vertical rows 50, 51, 52. The remaining steps of the method are the same, and result in an array which can be aligned at $\beta = 90°$ with respect to the direction of motion of the recording medium for applications such as multiple color printing, or in an inclined orientation ($\beta < 990°$) for high density printing.

The interdigitated array of FIG. 5B enables high density printing without inclining the assembly with respect to the direction of motion of the printing medium. In this array, the rows 53, 54, 55 form an angle $\alpha < 90°$ with respect to the vertical.

In summary, this invention provides a highly efficient method of fabricating a glass nozzle array that does not use an encapsulating material to seal the assembly. Instead, the method of this invention relies exclusively on the thermal properties of the materials for a good seal. As a result of this, the final array is stronger and more tolerant of ink properties.

The use of a two-glass fiber, with or without etchable cores, is characterized by different softening temperature so that the perimeter of the fiber provides the sealing function during the thermal cycle, while the internal, high temperature glass portion of the fiber guarantees the mechanical and physical integrity of the nozzle.

Finally, this invention allows the formation of two-dimensional arrays such as are shown in FIGS. 5 and 6 with highly precise spacing of adjacent nozzles in rows whether they be vertical or inclined.

While the invention has been particularly described with reference to the preferred embodiments, it will be understood by those skilled in the art that the foregoing and other changes in form and detail may be made without departing from the spirit and scope of the invention.

What is claimed:

1. A method of fabricating a multiple glass nozzle array wafer for use in an inkjet printing apparatus comprising the steps of
    forming an assembly comprising a plurality of cored glass fibers along a row for use as nozzles in said nozzle array, and a plurality of solid glass fibers for defining the distance along said row between centers of said nozzles in said nozzle array, all of said fibers having the same softening temperature and coefficient of expansion,
    applying uniform pressure to all sides of said assembly,
    heating the assembly to a temperature sufficient to soften the glass and fuse the fibers together,
    gradually cool the assembly,
    cutting the assembly into thin nozzle wafers, and
    mounting said thin nozzle wafer in a housing for said inkjet printer.

2. A method as in claim 1 wherein said cored glass fibers are etchable core glass fibers, and including the further step of etching out said cores after mounting said wafer in said housing.

3. A method as in claim 1 including the further step of placing a glass plate above and below the assembly, said glass plates having the same softening temperature and coefficient of expansion as said glass fibers.

4. A method as in claim 1 wherein each of said cored fibers comprises a circumferential low-temperature portion surrounding a layer of high-temperature glass which in turn surrounds said core, said heating step comprising subjecting the assembly to a temperature sufficient to soften said low-temperature glass but below the melting point of said high-temperature glass, softening of said low-temperature glass allowing fusing of said fibers under said pressure.

5. A method as in claim 4 wherein said distance determining fibers comprise first and second radially distinct portions of low-temperature glass and high-temperature glass,
    said heating step comprising heating said distance determining fibers to a temperature sufficient to soften said low-temperature glass but below the softening temperature of said high-temperature glass, whereby fusing of said fibers under said pressure is achieved.

6. A method as in claim 5 including the further step of placing a glass plate above and below the assembly, said glass plates having the same softening temperature and coefficient of expansion as said glass fibers.

7. A method as in claim 4 wherein said distance determining fibers comprises low-temperature glass, said heating step comprising heating said low-temperature glass to a temperature sufficient to soften said glass, whereby said pressure is sufficient to form said assembly.

8. A method as in claim 1 wherein said step of forming an assembly comprising forming a plurality of said rows, each row comprising cored glass fibers separated by said solid glass fibers.

9. A method as in claim 8 wherein said cored glass rows are assembled to form vertical columns in said array.

10. A method as in claim 9 wherein each of said cored fibers comprises a circumferential surface surrounding a layer of high-temperature glass which in turn surrounds said core, said heating step comprising subjecting the assembly to a temperature sufficient to soften said low-temperature glass but below the melting point of said high-temperature glass, softening of said low-temperature glass allowing fusing of said fibers under said pressure.

11. A method as in claim 10 wherein said distance determining fibers comprise first and second radially separate portions of low-temperature glass and high-temperature glass, said heating step comprising heating said distance determining fibers to a temperature sufficient to soften said low-temperature glass but below the softening temperature of said high-temperature glass, whereby fusing of said fibers under said pressure is achieved.

12. A method as in claim 11 including the further step of placing a glass plate above and below the assembly, said glass plates having the same softening temperature and coefficient of expansion as said glass fibers.

13. A method as in claim 8 wherein said cored glass rows are so assembled that they define columns inclined from a vertical axis of said array.

14. A method as in claim 13 wherein each of said cored fibers comprises a circumferential surface surrounding a layer of high-temperature glass which in turn surrounds said core, said heating step comprising subjecting the assembly to a temperature sufficient to soften said low-temperature glass but below the melting point of said high-temperature glass, softening of said low-temperature glass allowing fusing of said fibers under said pressure.

15. A method as in claim 14 wherein said distance determining fibers comprise first and second radially separate portions of low-temperature glass and high-temperature glass, said heating step comprising heating said distance determining fibers to a temperature sufficient to soften said low-temperature glass but below the softening temperature of said high-temperature glass, whereby fusing of said fibers under said pressure is achieved.

16. A method as in claim 11 including the further step of placing a glass plate above and below the assembly, said glass plates having the same softening temperature and coefficient of expansion as said glass fibers.

17. A method as in claim 12 wherein said fibers are rectangular.

18. A method as in claim 4 wherein said fibers are rectangular.

19. A method as in claim 5 wherein said fibers are rectangular.

* * * * *

UNITED STATES PATENT AND TRADEMARK OFFICE
CERTIFICATE OF CORRECTION

PATENT NO. : 4,786,303

DATED : November 22, 1988

INVENTOR(S) : Marco Padalino

It is certified that error appears in the above—identified patent and that said Letters Patent is hereby corrected as shown below:

Coverpage, [73] Assignees:, change "Ricoh Systems Inc., San Jose, Calif." to --Ricoh Corporation, San Jose, Calif.--.

Sheet 2 of the Drawings, substitute the attached sheet of drawings to correct FIG. 5A and FIG. 5B.

Column 1, line 20, change "invnetion" to --invention--.

Column 2, line 1, after "approach" insert --is--.

Column 4, line 34, change "plats" to --plates--.

Column 5, line 66, change "990" to --90--.

Signed and Sealed this

Twenty-seventh Day of February, 1990

Attest:

JEFFREY M. SAMUELS

Attesting Officer      Acting Commissioner of Patents and Trademarks